United States Patent [19]

Kierstead

[11] Patent Number: 4,864,287
[45] Date of Patent: Sep. 5, 1989

[54] APPARATUS AND METHOD FOR CALIBRATING A MOTOR MONITOR BY READING AND STORING A DESIRED VALUE OF THE POWER FACTOR

[75] Inventor: Bruce E. Kierstead, Hendersonville, N.C.

[73] Assignee: Square D Company, Palatine, Ill.

[21] Appl. No.: 915,913

[22] Filed: Oct. 1, 1986

Related U.S. Application Data

[63] Continuation of Ser. No. 512,492, Jul. 11, 1983, abandoned.

[51] Int. Cl.[4] .............................................. G08B 21/00
[52] U.S. Cl. .................................. 340/648; 340/657; 318/445; 361/79; 417/63
[58] Field of Search ............... 340/648, 660, 664, 657; 361/79, 90; 324/114; 318/474, 473, 452, 445; 417/44, 63; 364/483, 571

[56] References Cited

U.S. PATENT DOCUMENTS

| | | | |
|---|---|---|---|
| 3,340,372 | 9/1967 | Schaefer | 200/83 |
| 3,846,688 | 11/1974 | Perloff | 318/490 |
| 4,194,145 | 3/1980 | Ritter | 318/799 |
| 4,286,303 | 8/1981 | Genheimer et al. | 361/24 |
| 4,291,264 | 9/1981 | Siemon | 318/729 |
| 4,311,994 | 1/1982 | Kuribayashi | 340/661 |
| 4,331,262 | 5/1982 | Snyder | 364/571 X |
| 4,434,390 | 2/1984 | Elms | 318/473 |
| 4,451,823 | 5/1984 | Penn et al. | 340/648 |
| 4,454,462 | 6/1984 | Spann | 318/729 |
| 4,473,338 | 9/1984 | Garmong | 318/447 X |

Primary Examiner—Joseph A. Orsino
Assistant Examiner—Jeffery A. Hofsass
Attorney, Agent, or Firm—Richard T. Guttman; A. Sidney Johnston

[57] ABSTRACT

A monitor for an electric motor, the monitor capable of connection to a supply of electrical energy for the motor, has a microcomputer for measuring the power factor of a voltage applied to the motor and a current flowing to the motor, for storing a desired value of power factor, for comparing a measured value of power factor with the desired value of power factor, and for disconnecting the motor from the supply of electrical energy if the measured value of the power factor differs from the desired value of power factor by an amount that exceeds a predetermined amount. Further, the monitor has means for operating the motor while driving a desired load; means for commanding the microcomputer to measure a power factor of the voltage applied to the motor and the current flowing to the motor while the motor is driving the desired load; and, means for storing the measured value of the power factor, measured while the motor is driving the desired load, as the desired power factor. The monitor may control a motor driving a pump for a fluid system. The monitor may include: a pressure sensitive mechanical switch; means for measuring motor current, voltage applied to the motor, time intervals during which the motor is energized, and the rapidity of cycle time of the motor in order to disconnect the motor from the source of electrical energy to prevent damage to the motor.

10 Claims, 5 Drawing Sheets

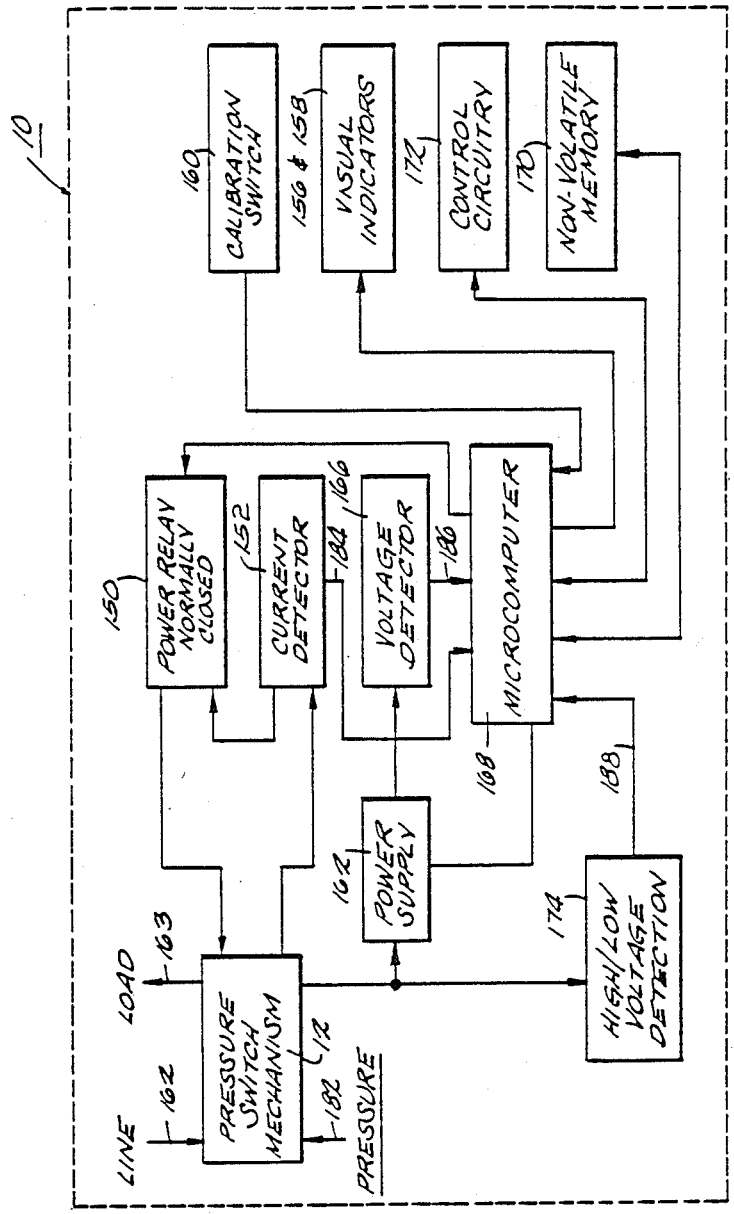

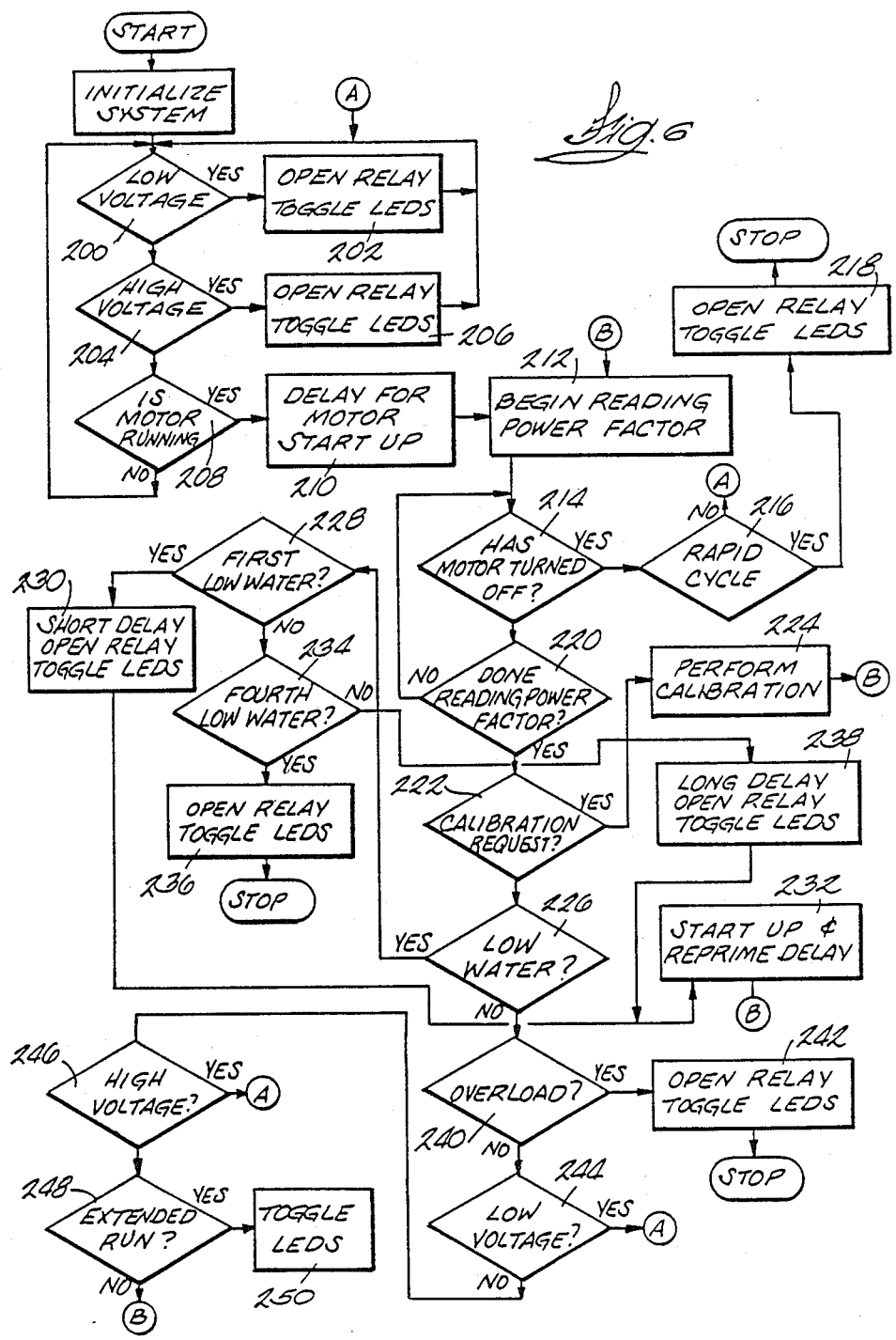

APPARATUS AND METHOD FOR CALIBRATING A MOTOR MONITOR BY READING AND STORING A DESIRED VALUE OF THE POWER FACTOR

This application is a continuation of application Ser. No. 512,492, filed on July 11, 1983 now abandoned.

The present invention relates to controls for electric motors and more particularly to a control switch having mechanical and solid state components for controlling the energization of a submersible pump motor.

BACKGROUND OF THE INVENTION

Fluid pressure responsive switches are well known and have long been used to control the energization of electric motors driving submersible pumps that deliver fluids under pressure from a well to a receiving tank during periods when the fluid pressure within the tank is lower than a preset pressure. An example of a control of this type is disclosed in an expired U.S. Pat. No. 2,741,678 and a U.S. Pat. No. 3,340,372. While controls incorporating features of these patents are presently extensively used, in certain pumping installations pump motors may be unprotected against damage which results when the recovery rate of the well from which the fluid is pumped is less than the rate at which the fluid is removed from the well. A pressure switch as disclosed in the U.S. Pat. No. 3,345,480 is intended to prevent motor damage under low water pumping conditions by permitting the motor to be energized as long as the well conditions permit the pump to maintain the fluid pressure of the system within a preset pressure range. The switch operates to prevent pump motor operation when the fluid level in the well is below the level which will permit the pump to maintain the desired system pressure. A further improvement in pressure switches for submersible pump motors appears in a U.S. Pat. No. 4,020,308, which discloses an arrangement for providing an indicating light in a cover of a fluid pressure switch. Pressure switches of the type included in the '308 patent are particularly suited for use in pumping systems where it is desirable to visually indicate periods when the pump motor is energized.

SUMMARY OF THE INVENTION

The mechanical pressure and other switch components according to the present invention are housed within a single enclosure. In the preferred embodiment of the invention, the enclosure is provided by a pair of housing parts with one of the parts, termed the lower housing part enclosing fluid pressure responsive components and snap acting switch parts and the other or upper housing part enclosing solid state and other electrical components that are connected to terminations on the snap switch in the lower housing parts by a separable or plug-in type connection to provide a convenient access to the pressure responsive components and wire terminals in the lower housing part for wiring and adjustment purposes. The upper housing part encloses solid state components, a relay and current and voltage detectors. The upper housing part also includes a calibrating button which is accessible from the top or front of the upper housing part and is provided to program the operation of the solid state circuits. The upper housing part also positions indicating lights which are coded to indicate the type of an operative malfunction of the pump motor.

It is an object of the present invention to provide a control for a pump motor with a segmented housing wherein one segment encloses a pressure responsive snap acting mechanism and the other segment contains solid state switching components and to electrically interconnect the snap switch with other components of the control by a plug-in type electrical connection.

A further object is to provide a control for a pump motor with a housing that encloses solid state components which are provided to monitor the operative condition of the motor and provide the housing with a switch button and indicating lamps which are respectively usable to calibrate the solid state components within the enclosure and indicate the operative state of the pump motor.

An additional object is to provide a control for a pump motor with components that detect variations in fluid pressure delivered by the pump, detect when the load on the motor is less than a normal value, detect when the motor is operating under locked rotor or overload conditions, detect when the duration of the pumping cycles are excessively long or short and when the input voltage to the motor is excessively high or low.

Another object is to provide a control for a pump motor with components that detect and provide signals indicative of the voltage, current and power factor of the motor current and control the operation of the motor in response to the the signals.

A still further object is to provide a control for a pump motor with components that detect and provide signals indicative of the pressure output of a pump driven by the motor and the current and voltage as well as the power factor of the motor current and provide a snap acting mechanical switch mechanism that is controlled by the pressure output and a means including electronic components for controlling the operation of the motor in response to the voltage, current and power factor.

Further objects and features of the invention will be readily apparent to those skilled in the art from the specification and the appended drawings illustrating a preferred embodiment in which a mechanically operated pressure switch having solid state components incorporating the features of the present invention is diagrammatically shown.

DESCRIPTION OF THE DRAWINGS

FIG. 4 is a chart showing the interrelation of the components in the control illustrated in FIG. 1.

FIG. 6 is a block diagram of a flow chart utilized by the control logic in the motor controller in FIG. 1.

DESCRIPTION OF PREFERRED EMBODIMENT

Figure 1:
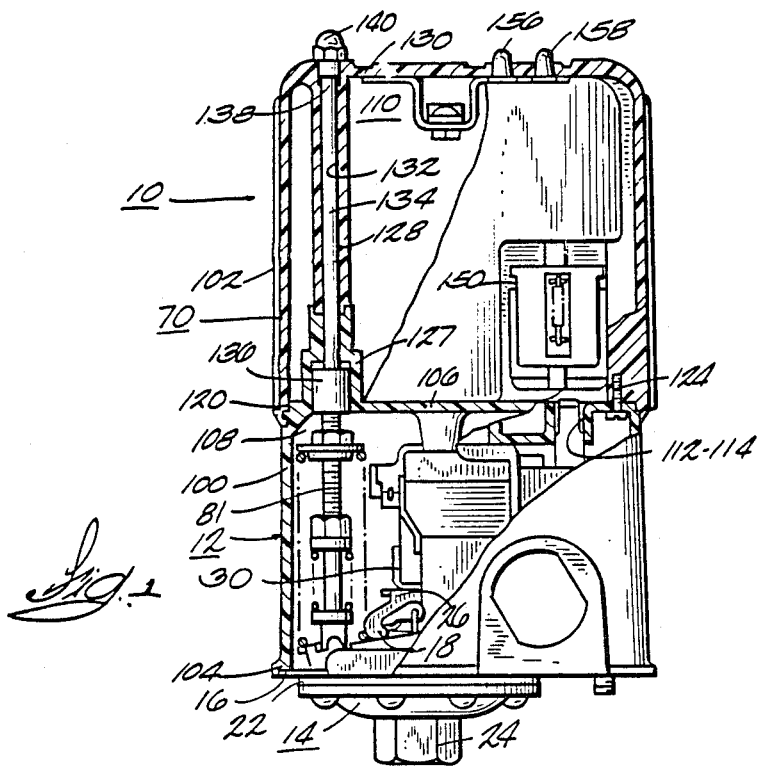
FIG. 1 and 1A are cross section elevation views of a pump motor controller that incorporates the present invention.

[Referring to the drawings, a control 10 incorporating a pressure switch mechanism 12 and a microprocessor type control includes mechanical and pressure responsive components as disclosed in U.S. Pat. No.

3,340,372, which was granted to Carl A. Schaefer and is incorporated herein by reference.] The control 10 is particularly suited for use in submersible pump installations wherein a pump and a motor driving the pump are submersed in the fluid within a well and delivers fluid under pressure to a receptacle located above ground.

As disclosed in the Schaefer patent, the pressure switch mechanism 12 includes a diaphragm mechanism 14 that is mounted on a support 16 and operates a snap action mechanism 18 including movable contacts 20 in response to variations in pressure imposed on the diaphragm mechanism 14. The diaphragm mechanism 14 includes a flexible diaphragm 22 that is moved in response to variations in fluid pressure imposed thereon through a fluid conduct, not shown, that is connected between a fluid receptacle, not shown, and a coupling 24. The snap acting mechanism 18 includes a member 26 that moves in response to movements of the diaphragm 22 and causes a snap acting movement of a member 30. The member 30 through an arm portion, an insulating contact carrier 66 and conducting member 68 provides a support for movable contacts 20 and causes the contacts 20 to engage pairs of stationary contacts 32 with a snap action when the diaphragm 22 responds to a pressure less than a selected pressure. The member 30 also causes the contacts 20 to move out of engagement with the contacts with a snap action when the pressure imposed on the diaphragm 22 is greater than a preselected value.

Figure 1A:
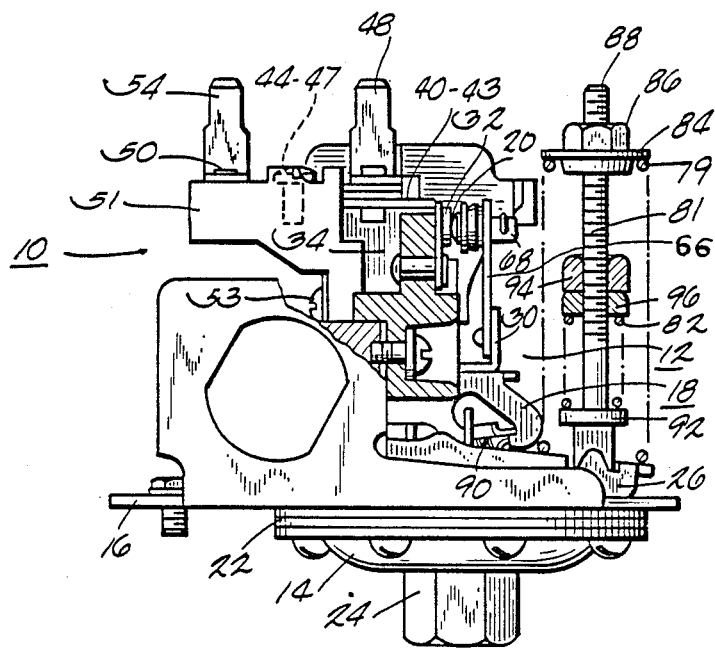
Figure 3:
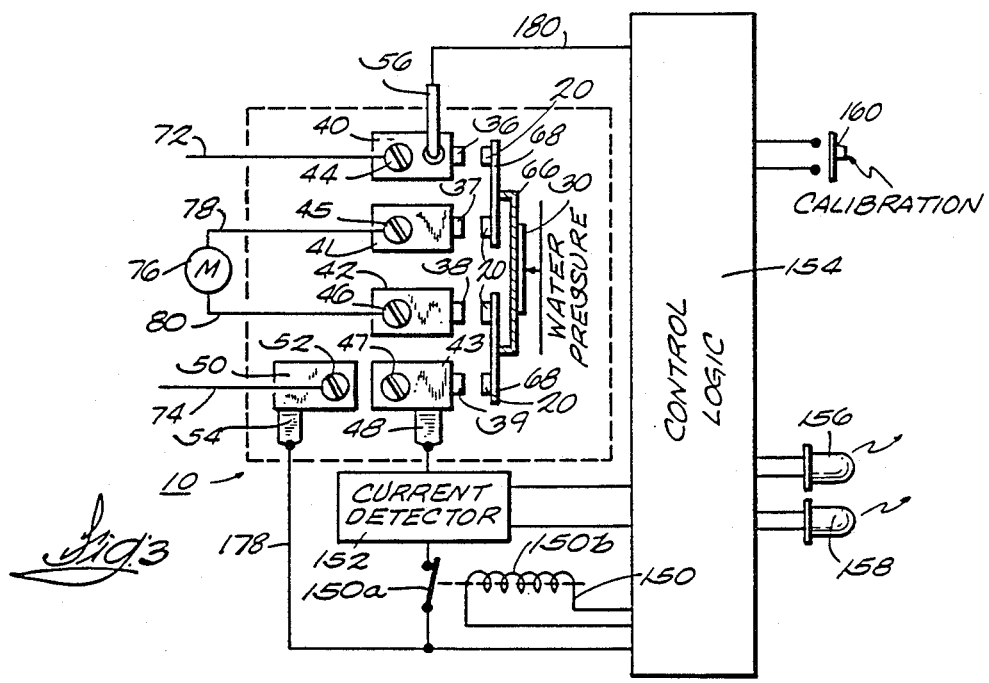
FIG. 3 is a diagram illustrating the functional relationship of certain of the components of the control in FIG. 1.

The stationary contacts 32 are carried on an insulating terminal block 34 that is in turn carried on the support 16, As most clearly shown in FIGS. 1A and 3, the stationary contacts comprises four contacts 36-39 that are positioned on the block 34 as two pairs of contacts with contacts 36 and 37 providing one pair and the contacts 38 and 39 providing the second pair. The contacts 36-39 are mounted on L-shaped terminal members 40-43 respectively with each terminal member 40-43 having a leg portion whereon its associated contact 36-39 is secured and a leg portion threadedly receiving terminal screws 44-47 respectively. One of the terminal members 40-43, e.g. terminal 43 is provided with a bayonet connector 48 and an additional or a fifth terminal, i.e., a terminal 50 is mounted on its own individual insulating block 51 and includes a terminal screw 52 as well as a bayonet connector 54. Additionally, one of the terminal members 40-43, e.g. terminal member 40 is engaged by a prong 56 that electrically engages the terminal member 40 as will be later described. The insulating block 51 is secured to the block 34 by a screw 53.

As shown in FIGS. 1A and 3, the contact carrier 66 is substantially V-shaped with each of its arms carrying a bridging conducting member 68 having a pair of the contacts 36-39 disposed at each end thereof. The contacts 36-39 are positioned to cooperate and engage adjacent pairs of the stationary contacts 32.

Referring to FIG. 1 and 3, the pressure switch 10 is wired when a cover 70, as will be later described in detail, is removed to provide access to the terminal screws 44-46 and the terminal screw 50. As shown, one side of an alternating current source, not shown, is connected through a conductor 72 and tightened terminal screw 44 to the terminal 40 and the other side of the A.C. source is connected via a conductor 74 and the tightened screw 52 to the fifth terminal 50. An alternating current motor 76 in the embodiment disclosed herein is connected by conductors 78 and 80 and tightened terminal screws 45 and 46 to the terminals 44 and 42 respectively.

As more fully described in the U.S. Pat. No. 3,340,372 the support 16 has a pair of posts. A range spring 79 is disposed about one of the posts 81 and a differential spring 82 is disposed about the other post of the pair. The range spring 79 has its upper end bearing against a cap washer 84 that is captivated by a nut 86 threaded on a threaded end 88 of the post 81 and is used to adjust the pressure operating range of the switch 10. The lower end of the range spring 79 abuts against and applies a force to a free end portion of the member or lever 26 that has relatively large openings through which the pair of posts including the post 81 extend. The amount of force applied by the spring 79 on the lever 26 is determined by the adjustment of the nut 86. The movement of the member 26 through a toggle mechanim including a toggle spring 90 is transmitted to the member 30.

As shown in FIG. 1A a post, not shown, is provided with a shoulder against which a cup washer 92 normally is biased by the differential spring 82. The spring 82 is compressed by a nut 94 bearing against a cup 96 which is positioned on the upper end of the spring 82.

The cover 70, in the preferred embodiment is formed of a pair of parts identified as a rear or lower cover part 100 and a front or upper cover part 102 which are formed as distinct parts 100 and 102 for manufacturing purposes. The cover 70 provides maximum protection to components mounted within the cover 70 and accessibility to the mechanical components and electrical terminations carried on the support 16 and enclosed within the cover part 100. The cover part 100 has a peripheral skirt or rear end 104 positioned adjacent the peripheral edge of the support 16 and a front wall 106 which acts as a dividing wall and separates the interior of the cover 70 into two chambers identified as a rear chamber 108 and a front chamber 110 when the cover parts 100 and 102 are assembled to each other. The wall 106 includes a pair of openings 112 and 114 which are located to receive the bayonet connectors 48 and 54 respectively and expose the ends of the connectors 48 and 54 in the front chamber 110. The wall 106 also includes an opening 116 which is provided in a bore extending through a post 118 that extends rearwardly from the wall 106. The post 118 and the opening 116 are located to receive the prong 56 that extends rearwardly from the chamber 110 through the opening 116 into engagement with the terminal 40.

Figure 2:
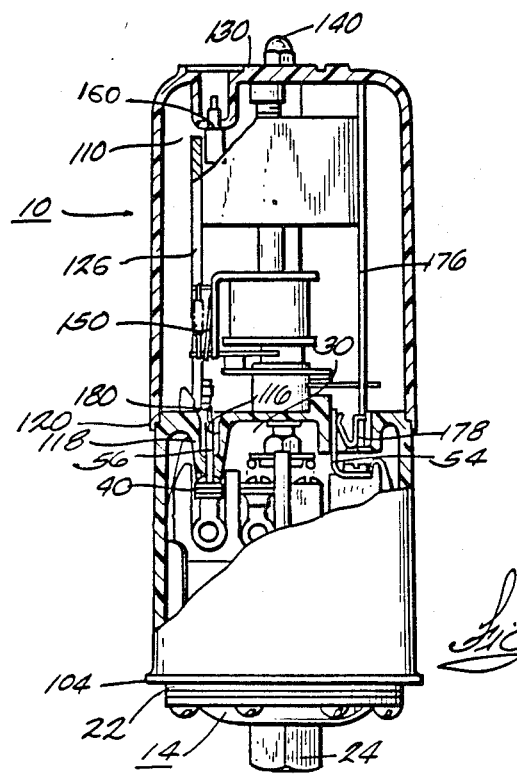
FIG. 2 is another cross section elevation view of the switch in FIG. 1.

The connectors 48 and 54 extend into the openings 112 and 114 respectively where the connectors 48 and 54 are engaged by a pair of spring biased plug-in connector type conductors, one of which is designated as 178 in FIG. 2 and represented by numerals 178 and 180 in FIG. 3. The pair of conductors 178 and 180 are secured to circuits in printed circuit boards 176 as will be later described. The bayonet connectors 48 and 54 as well as the prong 56 provide plug-in type interruptable connections and complete and interupt electric circuits when the cover to is removed and secured to the pressure switch mechanism 12.

The front or upper cover part 102 has a rear peripheral edge or skirt 120 engaging the front side of the periphery of the wall 106 so the parts 100 and 102, when secured to each other, will provide a unitary assembly or cover 70 which may be removed or secured as an assembly on the support 16. To provide this assembly, the front part 102 includes suitably tapped bosses which receive screws 124, one of which is shown in FIG. 1, which secure the rear end of the front part 102 to the front end of the part 100. When the parts 100 and 102 are assembled, the prong 56 extends through the opening 116 into engagement with the terminal 40. The prong 56 preferably includes an outer cylinder that is secured through a member to a printed circuit board 122, positioned in the chamber 110, and a plunger that is telescoped in the cylinder and engages the terminal 40 with a spring biased pressure engagement. Also when the cover parts 100 and 102 are assembled, a boss 127 extending forwardly from the wall 106 is aligned with a boss 128 extending rearwardly from a front wall 130 on part 102 and a bore 132 extending through the bosses 127 and 128 is aligned with the front threaded end of the post 81. When the cover parts 100 and 102 are thus assembled, a rod-like member 134 having a female threaded end 136 threaded on the post 81 extends through the bore 132 to a threaded front end 138 that extends through an opening in the front wall 130. A suitable nut 140 when an opening in the front wall 130. A suitable nut 140 when threaded on the end 138 secures the cover 70 to the support 16.

In addition to the on and off pressure switch function provided by the switch mechanism 12, the pressure switch 10 includes components enclosed within the front chamber 110 that are provided to protect the motor 76 against water system failures. Among the failures to which the pump motor may be subjected is a condition where no load is imposed on the motor as a result of a broken pump shaft or coupling, or an insufficient well recovery water flow, an air locked pump or a blocked pump intake. Another type of failure that can manifest itself is an overload condition which occurs as the pump is gradually clogged as when the pump gradually takes up sand. Additionally, the motor may be subjected to an overload resulting from excessive back pressure as caused by scaled and corroded discharge pipes, a failure of the check valve to open or an improper combination of the motor and the pump because of differences in their ratings. Other failures that may occur include extended run operation as caused by over usage of water, worn pump parts or leaks in the service piping and rapid cycling of the pump as maybe occasioned because of a water logged tank, a check valve leak or leaks in the service piping. The components within chamber 110 are provided to detect these failures and institute a proper response to minimize damage resulting from the failures.

The components of the control 10, as shown in FIG. 3, that are in the front chamber 110 include a control relay 150, a current detector 152, and solid state elements identified as control logic 154. Additionally, the components include a pair of light emitting diodes (LEDS) 156 and 158 and a recessed calibration switch 160 having normally open contacts. The diodes 156 and 158 as well as the recessed switch 160 are mounted in the front wall 130 so as to be respectively visible and accessible from the front side of the cover 70.

Referring to the FIGS. 3 and 4, the control 10 includes the pressure switch mechanism 12, a power supply 162, the control relay 150 having normally closed contacts 150a and a coil winding 150b, a current detector 152, a voltage detector 166, a single chip microcomputer 168, the calibration switch 160, the LED diodes 156 and 158, a non-volitile memory 170, associate control circuitry 172 and a high/low voltage detector 174.

The power supply 162, the current detector 152, the voltage detector 166, the microcomputer 168, the memory 170, the control circuitry 172 are provided by solid state components mounted on printed circuit boards 122 and 176, in a manner well known to those skilled in the art. The boards 122 and 176 are maintained in parallel spaced relation by the cover 102. The relay 150 is mounted between the boards 122 and 176 and is enclosed along with the current detector 152 within the chamber 110.

The pressure switch mechanism 12 is mechanical and switches the movable contacts 20 into a circuit closing position or a circuit opening position in response to changes in the input pressure on the diaphragm 22. When the pressure falls below a preset pressure setting, the contacts 20 move with a snap action to a circuit closing position with the stationary contacts 32 and the motor 76 and a pump, not shown, is energized. The energized pump causes a pressure increase on the diaphragm 22 and the contacts 20 are moved with a snap action to a circuit opening position to deenergize the motor 76 when the pressure on the diaphragm 22 exceeds a reset value.

As shown in FIG. 3, an alternating current source is connected via conductors 72 and 74 to the terminals 40 and 50 respectively. The terminal 50 is connected to the bayonet conductor 54 and components within the front chamber 110 by the plug-in type connector 178. The terminal 40 is connected to components within the front chamber 110 by the prong 56 and the plug-in type connector 180.

The connector 54 is connected through the closed contact 150a, a suitable conductor surrounded by a pick up coil, not shown, of the current detector 152 to the bayonet connector 48. The connector 54 also supplies an input to the control logic 154. The probe 56 is connected to the supply lead 72 and supplies an input to the control logic 154. In FIG. 4, the pressure switch mechanism 12 is shown as having an input 162 which represents the conductors 72 and 74 in FIG. 3. The mechanism 12 is also shown as having an output 163 which represents the conductors 78 and 80 in FIG. 3. The fluid pressure which is imposed upon the coupling 24 in FIG. 1 is represented by the arrow 182 which designates the pressure imposed on the pressure switch mechanism 12. As shown in FIG. 4, the power supply 162, the power relay 150, the current detector 152, the voltage detector 166, the high/low voltage detector 174, the microcomputer 168, the non-volitile memory 170 and the control circuitry 172 are all enclosed within the front chamber 110. The calibration switch 160 and the visual indicators 156 and 158 are positioned by the front wall 130.

The pressure switch mechanism 12 is totally mechanical and switches the two sets of movable contacts 20 to energize or deenergize the motor 76 in response to the input pressure 182. When the pressure 182 falls below a low pressure setting, the contacts 20 engage the stationary contact 32 and energize the motor 78. The pressure increases until a high pressure setting is exceeded whereat the contacts 20 open with a snap action to deenergize the motor 76. The power supply 162, as included within the front chamber 110, supplies the energizing current and voltage to the other previously mentioned components included within the front chamber 110. The power relay 150 has normally closed contacts 150a in series between the connectors 54 and 48 and an operating coil 150b connected to receive an output from the microcomputer 168. The microcomputer 168 monitors the operation of the motor 76 and thereby the operation of the pump in the system. When a proper output signal is received from the microcomputer 168, the relay 150 opens the contact 150a and thereby inhibits the pump from running even though the contacts of the switch mechanism 12 are closed due to a low pressure signal input 182. During normal operation when the conditions in the the motor fluid circuit are normal, the contacts 150a are closed. The current detector 152 includes a current transformer not shown, that converts the motor current sine wave into a logic level square wave that is inputted through a lead 184 to the microcomputer 168. The edge of the output pulse from the current detector 152 corresponds to the zero crossing of the motor current.

The voltage detector 166 has an output 186 which is supplied as an input to the microcomputer 168. the microcomputer 168 also receives an input from the power supply 162. The voltage detector 166 converts the voltage sine wave of the A.C. supply into a logic level square wave which is supplied to the microcomputer 168. The edge of the square wave output 162 corresponds to the zero crossing of the voltage across the motor 76. The microcomputer 168 is arranged to count the time interval between the zero crossing of the voltage signal on the lead 186 and the zero crossing of the current on lead 184 and thereby provide a measure of the power factor of the current to the motor 76.

The high/low voltage detector 174 converts the line voltage on the line 162 into two logic level outputs that are supplied as an input 188 to the microcomputer 168. The microcomputer 168 ignores the input 188 as long as the voltage on line 162 is within preset high and low limits. When the output of the voltage detector 174 is present due to a voltage higher or lower than the preset limits, the detector 174 through the microcomputer 168 provides a signal to the power relay 150 which causes the relay to open its contacts 150a and thereby deenergize the motor 76.

The microcomputer 168 is the central and controlling device in control 10. The microcomputer 168 monitors the pumps operation that is conveyed by signals from the motor as previously described. The microcomputer 168 provides an output to the relay 150 in response to signals indicative of the motor conditions as will be subsequently described.

The control 10 includes a non-volatile memory 170. The memory 170 is an EEPROM (Electrically Eraseable Programmable Read Only Memory). The memory is of the type which will retain any information stored in it in event of power removal or failure. An important piece of data which is to be stored in the memory 170 is the calibration value as will be hereafter described. All other data values will be programmed into the memory when the control 10 is manufactured. The item designated as control circuitry 172 includes components that are required to support the microcomputer 168, i.e., a suitable clock crystal, not shown.

The switch 160 is mounted in the front wall of the cover 70 and is thus readily available for calibration purposes. After the electrical and plumbing connections of the pump system associated with the control 10 are complete, the motor and pump are energized. When the motor is running under normal operating conditions, the calibration switch 160 contacts are closed and an input is supplied to the microcomputer 168 which jumps to a software routine and stores the calibration reading value in the the non-volatile memory 170 for future use.

The arrangement of the switch 160 in the cover 70 is such that the switch 160 is in a recess and after the calibration procedure is completed, an adhesive sticker can be applied to the front wall 106 to conceal the switch 160. If desired, the date of calibration maybe inscribed on the applied sticker.

Figure 5:
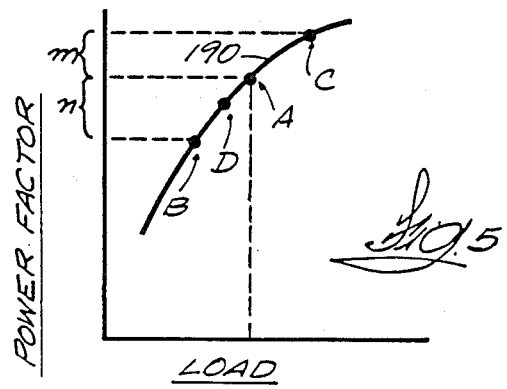
FIG. 5 is a diagram showing the range of the operation of the control in FIG. 1.

The memory in which the calibration value is stored is of the non-volitile type that does not require power to retain its data and has its data available each time power is applied to the control 10. Thus, even if power is removed from the control 10, the calibration data in the memory remains so that re-calibration of the switch is not required. The normal operating power factors of electric motors vary not only with load and voltage but also with the design of the motor and horsepower rating. The calibration feature is included in the controller 10 to compensate for these variations. According to FIG. 5, POINT A on a curve 190 is a normal operating power factor or calibration value which was entered into the memory of the control 10 when the switch 160 was operated. The value of POINT A on the curve 190 is used for comparison with an actual running power factor value, designated as a POINT D. The location of POINT D on the curve 190 will vary for reasons such as variations in load, voltage and pressure of the motor and pump system and is constantly checked and compared with POINT A. When POINT D moves away from POINT A by a plus value greater than a value "M" or less than a "N" value, the power relay 150 is energized and the motor is deenergized and proper signals are indicated by the illuminated state of the diodes 156 and 158. The M and N values are fixed in the software of the microcomputer 168 so that normal variation in the motor operating characteristics will not cause false tripping when the control 10 is properly calibrated.

The section containing the visual indicators desiginated as diodes 156 and 158 is arranged to have the diodes 156 and 158 located in the front wall 130 so the diodes are visible from the exterior of the control 10. The light emitting diodes 156 and 158 are preferably chosen to have contrasting colors such as a color red for the diode 156 and a yellow for the diode 158. As shown in the table below, "F", "S" and "OFF" indicate the illuminating state or condition of the diodes 156 and 158 and thereby are coded to indicate the improper operating condition of the motor and pump. The diodes, when operating in the manner indicated, will provide an indication of the type of failure occurring in the system. In the present embodiment, the coding of the diodes is as follows with "F" indicating a flashing diode, and "S" designating a diode that is continously energized and "OFF" designating a deenergized diode.

| Condition | Red LED | Yellow LED |
|---|---|---|
| Noload | F | F |
| Rapid Cycling | S | S |
| Low Voltage | F | S |
| High Voltage | S | F |
| Overload | F | OFF |
| Extended Run | OFF | S |
| Normal On/Off | OFF | OFF |

When a low water condition or a motor or pump noload occurs, the power factor of the motor will drop below 0.45 and the motor current will decrease. The reduced motor current reduces the urgency to deenergize the motor and permits attempts to restart the motor several times before the motor is finally deenergized. When a noload condition occurs, the pump controller will detect the change in power factor and deenergize the motor. After a short delay, the microcomputer will attempt to restart the motor. If the noload condition persists, the microcomputer will progressively increase the delay interval of subsequent restarts and after a fixed number of preprogrammed delayed restarts, the microcomputer will cease its attempts to restart the motor. By detecting the power factor change, the motor is thus protected from damage. In case of a broken shaft or plugged inlet of the pump, the motor will not be damaged even though the pump requires service.

Overload conditions of the pump and motor may be the result of different causes. A motor overload occurs under locked rotor conditions and a pump overload occurs when an increase in back pressure causes the fluid flow of the pump to be decreased. The distinction is made between these two overload conditions because the current and voltage parameters of the motor change differently for the two conditions and therefore different protection features are required to protect the pump and motor under the two different overload conditions. Motor overload can occur when the pump is plugged with sand or the motor is stalled. In this case, the timing of the motor going to a locked rotor condition is the important factor in the protection of the pump controller. When the pump is slowly clogged by sand, the controller will have time to detect the power factor increase and deenergize the motor. In contrast, when the pump and motor are locked, the pump and motor will require a removal from the well to clear the pump, and any protection additional to the protection offered by the conventional circuit breaker in the circuit would be superflous. Additionally, if the controller did sense the locked rotor or pump plugged condition, the restarting of the pump and motor would aggravate the situation. For this reason, time delays and restarts are not attempted under locked rotor or plugged pump conditions.

When the pump is subjected to an overload that is caused by excessive back pressure, the flow output of the pump is reduced and the power factor and current to the motor both decrease. When this type of failure is detected, ample time will permit the motor to be deenergized before the pump and motor are damaged. If the pump overload conditions continue, a noload signal may be given because the controller cannot distinguish between a noload and excessive back pressure conditions.

When the pump system is subjected to extended run conditions, the microcomputer times the interval beginning with the pump energization and if pressure is not restored within a preset time limit, a visual signal will be given.

Rapid cycling results from a water logged tank, a check valve leak, or leaks in the plumbing. The controller 10 detects a low pressure signal and energizes the motor to restore the proper pressure. If after the motor is deenergized, a low pressure signal is prematurely detected, a signal will prevent the motor from being energized until the system is reset. This function protects the motor from overheating due to repeated high starting currents in the motor. The control also detects over voltage conditions which causes excessive stress in the motor windings and under voltage conditions which cause overheating of the motor windings. Good motor design dictates that a motor should not be subjected to voltages 10% greater or 10% less than its nominal voltage rating. In the controller according to the present invention when an incorrect voltage level is detected, the controller will inhibit the motor from being energized and in this manner, extend the life of the motor being controlled.

The operation of the control 10 as illustrated in FIG. 6 is believed to be self-evident and the construction of the control to be readily apparent to those skilled in the art to which the present invention pertains. As shown in FIG. 3, the control logic 154 is continuously energized from the source connected to conductors 72 and 74, the connector 178 and the conductor 180. Further as shown in FIG. 4, the power supply 162 supplies an input to the voltage detector 166 and the microcomputer 168. The current detector 152 and the high/low voltage detector 174 provide inputs to the microcomputer 168.

Initially, when the motor 76 is energized, as a result of a reduced fluid pressure signal 182, the output of the high/low voltage detector 174 is interrogated by the microcomputer 168. If the voltage of the supply is too low, control is transferred from a block 200 to a control 202 which provides an energizing signal to the relay coil 150b to deenergize the motor 76 and provide a toggle signal which causes the red LED 156 to flash and the yellow LED 158 to have a steady glow to indicate a low voltage condition across conductors 72 and 74. If the low voltage condition is absent, control is transferred to the block 204 and the control 206 which determine if the supply voltage is too high. If the supply voltage is too high, a control 206 provides an output which energizes the relay coil 150b to deenergize the motor 76 and toggles the red LED 156 to a steady state and a the yellow LED 158 to a flashing state to indicate a high voltage condition.

In the event a high voltage condition is not present, control transfers to a block 208 which checks if the motor 76 is operating as indicated by a proper motor current. If the motor is not running, control returns to the block 200 via an input A to reinitiate the starting current to the motor. If the block 208 determines that the motor 76 is energized, a control signal is initiated after a preset time delay by a control 210 that permits a block 212 to interrogate signals from the current detector 164 and the voltage detector 166 to determine the power factor of the motor current.

After reading of the power factor by the control 212 is inititated, control transfers to a block 214 which determines if the motor has turned off. In the event the block 214 determines that the motor is turned off, control transfers to a block 216 that determines if the interval of an on/off operating cycle of the motor is less than a preset value. In the event that the operating cycle of the motor is less than the preset value, control is transferred to a control 218 which energizes the relay coil 150b to deenergize the motor 76 and toggles the red LED 156 to a steady state and the yellow LED 158 to a steady state to indicate rapid cycling of the motor. If the block 216 determines that the operating cycle is not less than the preprogrammed value, control is returned to POINT A.

After the reading of the power factor on the motor is initiated by the control 212 and the block 214 has determined that the motor is not turned off, control is transferred to a block 220 that determines if the power factor of the motor current has been read. If the reading of the power factor is not completed, control is returned to block 214 which again determines if the motor is turned off before control is retransferred to the block 220. If the reading of the power factor of the motor is completed, block 220 transfers control to a block 222. Block 222 determines if a calibration request has been initiated by closure of the contacts of switch 160. In event that a a control 224 which causes the entry of the parameters of the calibration into the microcomputer 168 and returns control to the block 212 at POINT B.

In the event that a calibration value has been entered, control transfers to a block 226. Block 226 determines if a noload condition is present as may be caused by a low water condition. The low water condition is indicated by a drop in the power factor below 0.45 and a motor current decrease. When a low water condition is present, control transfers to a block 228 that determines if the condition sensed is the first low water condition. If the low water condition sensed by block 228 is the first low water condition, control is transferred to a control 230 which after a short delay energizes the relay 150 to deenergize the motor 76 and toggles the red LED 156 to a flashing state and the yellow LED 158 to a steady state to indicate a low water or noload condition is present. After a short delay, control is transferred from the control 230 to a block 232 which deenergizes the relay 150 and restarts the motor 76. The block 228 responds to successive indications of a low water or noload conditions and supplies an input to a block 234 for each occurrance. After the block 234 determines that four successive noload conditions have occurred, it transfers control to a control 236 which energizes the relay coil 150b and toggles the LEDS 156 and 158 to indicate a low water or noload condition is present as previously described. In the event that the condition sensed by the block 234 is not the fourth low water condition, control is transferred to a control 238 which progressively increases the delay of the signal supplied to the block 232 as second and third low water conditions are sensed by the block 226. Thus after four low water conditions have been sensed by the block 226 the relay 150 is energized to interrupt the motor circuit and the diode is energized to interrupt the motor circuit and the diode LEDS 156 and 158 are energized in the manner previously described.

If the system does not have a low water or a noload condition, control is transferred from block 226 to a block 240. If a motor and/or pump overload condition is present, the power factor of the motor current will increase above POINT C in FIG. 5 and the block 240 transfers control to a control 242. The overload condition causes the control 242 to energize the relay 150 which deenergizes the motor 76 and toggles the red LED 156 to have a flashing output and the yellow LED 158 to be off.

If an overload condition is not present the block 240 transfers the control to a block 244. Block 244 responds to a low voltage signal from the detector 174 and if a low voltage signal is present, transfers to control via the POINT A to block 200 which energizes the relay 150 to stop the motor and toggles the red LED 156 to have a flashing output and the yellow LED 158 to have a steady or continuous output.

In the event that the voltage detected by the block 244 is higher than the preprogrammed value, control is transferred to a block 246 which interrogates a signal from the detector 174 and supplies an output indicating a high voltage through POINT A and through the low voltage block 200 to the high voltage block 204. The block 204 in response to the detected high voltage transfers control to control 206 which energizes the relay 150 to stop the motor 76 and toggles the LEDS so that the red LED 156 is continuously illuminated and the yellow LED 158 has a flashing output.

If the signal from the voltage detector 174 to the block 246 discloses that the motor is operating within the preset voltage limits, control is transferred to block 248. The block 248 times the period that the pump is running and if the running time of the pump is excessive, control is transferred to a control 250. If the time period of the pumping cycle is excessive, the transfer of the control to the control 250 causes the control 250 to toggle the LEDS so that the red LED 156 is not illuminated and the yellow LED 158 has a steady output.

If an extended run is not detected by the block 248, control is transfered from the block 248 to the POINT B and another cycle of interrogating operation of the motor voltage and current in the manner described occurs.

While certain preferred embodiments of the invention have been specifically disclosed, it is understood that the invention is not limited thereto, as many variations will be readily apparent to those skilled in the art and the invention is to be given its broadest possible interpretation within the terms of the following claims.

I claim:

1. In an improved electric motor monitor, the monitor capable of connection to a supply of electrical energy for the motor, having;
   a microcomputer for measuring the power factor of a voltage applied to said motor and a current flowing to said motor, for storing a desired value of power factor, for comparing a measured value of power factor with said desired value of power factor, and for disconnecting said motor from said supply of electrical energy if said measured value of said power factor differs from said desired value of power factor by an amount that exceeds a predetermined amount,
   the improvement comprising:
   means for operating said motor while driving a desired load;
   means for commanding said microcomputer to measure a power factor of said voltage applied to said motor and said current flowing to said motor while said motor is driving said desired load; and,
   means for storing said measured value of said power factor, measured while said motor is driving said desired load, as said desired power factor.

2. In an improved electric motor monitor, the monitor capable of connection to a supply of electrical energy for the motor, having:
   a microcomputer for measuring the power factor of a voltage applied to said motor and a current flowing to said motor, for storing a desired value of power factor, for comparing a measured value of power factor with said desired value of power factor, and for disconnecting said motor from said supply of electrical energy if said measured value of said power factor differs from said desired value of power factor by an amount that exceed a predetermined amount,
   the improvement comprising:
   said microcomputer periodically measuring the time interval between the zero crossing of a waveform of said voltage applied to said motor and the zero crossing of a waveform of said current flowing in said motor to determine the value of the power factor, and the power factor is compared with the desired power factor;

means for operating said motor while driving a desired load;

means for commanding said microcomputer to measure a power factor of said voltage applied to said motor and said current flowing to said motor while said motor is driving said desired load; and non-volatile memory means for storing said measured value of said power factor, measured while said motor is driving said desired load, as said desired power factor;

at least one illuminating device externally visible and operatively connected having coded multiple illuminating states to indicate the operating state of the motor;

a power relay which interrupts motor current on microcomputer command if the power factor exceeds the desired power factor by a first predetermined amount, and if the power factor is less than the desired power factor by a second predetermined amount.

3. The apparatus as in claim 2 wherein said means for storing a value of said power factor in a memory further comprises:

a manually operated push button which, when depressed by a person, causes said microcomputer to read a value from said means for measuring the power factor and said microcomputer subsequently stores said value in a non-volatile digital memory.

4. The apparatus as in claim 2 further comprising:

a support, a pressure responsive snap acting switch mechanism mounted on the support and having terminals connected to an A.C. source and terminals connected to an A.C. motor, a cover having a rear end positioned on the support, side walls extending forwardly from the rear end to a front end, a front wall extending between the front end of the side walls and a cavity extending between the support, the side walls and front wall and enclosing the pressure responsive snap acting switch mechanism;

a wall extending between the side walls dividing the cavity into a rear chamber wherein the switch mechanism is enclosed and a front chamber, a plurality of components including a programmable microcomputer chip positioned in the front chamber;

and a manually operable switch mounted on the front wall so that the switch is operably accessible to an operator, and contacts in circuit with the microcomputer for entering electrical data relating to the motor into the microcomputer wherein the data reflect a desired operating condition of the motor when the motor is energized and the switch is operated.

5. The pressure switch as recited in claim 4 wherein a wall extending between the side walls divides the cavity into a front chamber and a rear chamber and the snap acting switch mechanism is positioned in the rear chamber and the components are positioned in the front chamber.

6. The pressure switch as recited in claim 4 wherein at least one illuminating device is positioned on the front wall and externally visible and connected in circuit with the components to have coded multiple illuminating states to indicate the operating state of the motor.

7. The apparatus as in claim 6 wherein at least one illuminating device is visible externally of the front wall to indicate an operating condition of the motor.

8. The apparatus as in claim 7 wherein two illuminating devices having contrasting colors are positioned on the front wall.

9. The apparatus as in claim 8 wherein the terminals and components are electrically connected by a separable connection.

10. A pump and electric motor monitor for an AC electric motor driving a pump in a fluid system, the monitor capable of connection to a supply of AC electrical energy for the motor, comprising:

a microcomputer for measuring the power factor of a voltage applied to said motor and a current flowing to said motor, for storing a desired value of power factor, for comparing a measured value of power factor with said desired value of power factor, and for disconnecting said motor from said supply of electrical energy if said measured value of said power factor differs from said desired value of power factor by an amount that exceeds a predetermined amount, means for operating said motor while driving a desired load;

means for commanding said microcomputer to measure a power factor of said voltage applied to said motor and said current flowing to said motor while said motor is driving said desired load;

non-volatile memory means for storing said measured value of said power factor, measured while said motor is driving said desired load, as said desired power factor;

a pressure sensitive switch having terminals connected to said supply of AC electrical energy and terminals connected to said AC motor for maintaining a pressure in said fluid system within desired upper and lower pressure limits;

means for monitoring motor current and for disconnecting said motor from said supply of AC electrical energy if said current becomes outside of desired current limits;

means for monitoring voltage applied to said motor and for disconnecting said motor from said supply of AC electrical energy if said voltage becomes outside of desired voltage limits;

a housing containing said microcomputer, solid state components, and said pressure sensitive switch, thereby providing a fluid system monitor capable of maintaining pressure within desired limits, capable of disconnecting said motor is said motor looses its load, capable of disconnecting said motor if said current becomes outside of desired current limits, capable of disconnecting said motor if said voltage becomes outside of desired upper and lower limits, and contained within said housing.

* * * * *